United States Patent
Goldburt et al.

[11] Patent Number: 6,158,169
[45] Date of Patent: Dec. 12, 2000

[54] MACHINE FOR ENHANCING PHOTOSYNTHESIS

[75] Inventors: E. Tim Goldburt, Chappaqua; Albert Sieignano, Mt Kisco; Matt Sandy, Chappaqua; Peter von Gundlach, Bisbee, all of N.Y.

[73] Assignee: General Phosphorix LLC, Ardsley, N.Y.

[21] Appl. No.: 09/064,265

[22] Filed: Apr. 22, 1998

[51] Int. Cl.[7] ................................................. A01G 9/00
[52] U.S. Cl. .................................. 47/17; 52/63; 523/135
[58] Field of Search ............................ 47/17, DIG. 8; 52/63, 86; 135/119; 206/223

[56] References Cited

U.S. PATENT DOCUMENTS

| | | |
|---|---|---|
| 3,043,709 | 7/1962 | Amborski ................................ 47/17 |
| 3,424,178 | 1/1969 | Yazaki ................................. 135/119 |
| 3,741,631 | 6/1973 | Laing ..................................... 47/17 |
| 4,108,373 | 8/1978 | Chiapale et al. ......................... 47/17 |
| 4,622,950 | 11/1986 | Greenbaum ............................. 47/17 |
| 4,895,904 | 1/1990 | Allingham ............................. 523/135 |
| 5,519,964 | 5/1996 | Kujirai et al. ........................... 47/17 |
| 5,660,002 | 8/1997 | Lashinger .............................. 52/63 |
| 5,730,281 | 3/1998 | Powell et al. .......................... 206/223 |
| 5,813,169 | 9/1998 | Engerman .............................. 47/17 |
| 5,815,991 | 10/1998 | De Ridder ............................. 52/86 |

*Primary Examiner*—Peter M. Poon
*Assistant Examiner*—Francis T. Palo
*Attorney, Agent, or Firm*—I. Zborovsky

[57] ABSTRACT

A method and apparatus for controlling light and temperature necessary for the optimum growth of vegetables and plants for backyard gardeners. This is achieved by using a photo-transforming membrane supported by a light-weight, luminescent, portable and easily-assembled without tools frame. The components of the apparatus can be efficiently and compactly packaged, suitable for mass distribution. The membrane has photo-transforming qualities which transform UV-light into a bandwith of light that promotes photosynthesis. This, in turn, enhances crop growth and increases internal ambient temperature.

13 Claims, 6 Drawing Sheets

MACHINE FOR ENHANCING PHOTOSYNTHESIS

BACKGROUND OF THE INVENTION

This invention relates generally to the field of agriculture, and more particularly to a device for enhancing photosynthesis.

Recently, many public broadcasts have alarmed consumers about contaminated vegetables and fruits imported from countries which do not have to comply with our food content and contamination standards. This produce has led to localized outbreaks of food poisoning, particularly amongst grade school students.

SUMMARY OF THE INVENTION

Accordingly, it is an object of present invention to provide a device which avoids the disadvantages of the prior art.

In keeping with these objects, a device for enhancing photosynthesis is proposed which includes a additive-treated lens. This lens quantitatively converts and utilizes the previously unavailable and harmful portion of the light spectrum to amplify the benefits of photosynthesis for enhanced and accelerated plant growth and yield.

We intend to apply this recently-developed technology for agribusiness which satisfies the economies of scale necessary to produce the material at a cost-effective price for the homeowner. Therefore, we also feel that there exists, an as of yet, unrecognized market for a scaled-down, semi-mobile, homeowner-manageable, plant-growing appliance.

Some of the key considerations in addressing the above-mentioned challenges, were ease of erection, use, and aesthetics, as well as packaging, price, and market ecology.

Many popular home-oriented products purchased today require the end user to provide the final assembly, which particularly impacts packaging. We have, at this point, designed these products to include a maximum number of preassembled components to simplify assembly without increasing the bulk of the packaging. By configuring the initial offering into three functional and dimensional scales of complexity and size, we hope to be able to appeal to the dilettante as well as to the serious home gardener.

The structure, as presented, utilizes off-the-shelf components in order to reduce the capital investment cost of special tooling. In addition, it employs existing manufacturing technologies available in any third world country for optimal labor cost control. Moreover, the form of the support system can be enhanced using the luminescent covering of our proprietary product. As an added safety benefit, it will give its distinctive nocturnal glowing signature visible to all through its transparent skin.

The prototypes under initial consideration employ the traditional tunnel greenhouse shape. Nevertheless, the system permits other shapes as well, including the dome and the frame. Preliminary investigations indicate the feasibility of a balanced tension supported membrane as a second-generation offering. This suggests a minimalist three-dimensional sculptural geometry, such as hyperbolic parabloids, which would elevate its aesthetic integration of form and function.

We, therefore, are convinced that the growing, value-driven device will benefit and address the needs of every element in the production, marketing and final consumption chain.

In accordance with the present invention a device is proposed, which has a frame and a special membrane attached to the frame and converting harmful UV-light for plants or vegetables into growth-enhancing light that promotes photosynthesis. plastic, resin, tubular frame which is easily assembled without tools, lightweight, and portable in its unassembled or assembled form. In addition, the device reduces wind-resistance because of its airfoil design with valved panels. With the use of phosphorescent coating, the luminescent frame offers nocturnal safety. The device is supported by a water-ballasted structure stabilization which includes an integrated water-distribution irrigation system. This environmentally non-polluting growing appliance is covered by a fitted membrane, made of 6–10 mil polyethylene plastic. The membrane has photo-transforming qualities which convert harmful UV-light for plants and vegetables into growth-enhancing light that promotes photosynthesis. The fitted membrane is joined by heat-laminated seams over the frame, and is stabilized by 2 water-filled ballasted bladders. Each bladder has a filling and sealing fixture. One bladder is permanently affixed to the frame as a hinge, and the other bladder may be fastened to the frame at will for the purpose of stabilization. By transforming harmful UV-light for plants and vegetables, this growing device enhances crop growth. It extends the growing season, accelerates the ripening period by up to 3 weeks, increases the crop yield up to 50%, provides frost protection down to 18° F., reduces the crop's sunburns and increases essential vitamins in fruits and vegetables. Finally, the growing device provides excellent durability increased freedom from maintenance.

The primary object of the invention is to provide a better growing device. Another primary object is to extend the growing season. Another object of this device is to accelerate the ripening period. Another object of the invention is to increase the crop yield. Still another object of the invention is to provide increased frost protection. Another object of the invention is to increase the growing temperature. Another object of the invention is to reduce crop sunburns. Another object of the invention is to increase essential vitamins in fruits and vegetables. Yet another object of the invention is to provide durability and simplify maintenance. Another object of the invention is to use film which is less vulnerable to ultraviolet radiation and resulting degradation. Another object of the invention is to develop a device which is easily and rapidly assembled. Another object of the invention is to make the unassembled device package compact, to be easily portable. Another object of the invention is to develop a design which offers less wind-resistance. Another object of the invention is to provide a structure with nocturnal visibility and safety. Another object of the invention is to develop structure stabilization through water-ballasted live tension load. Another object of the invention is to provide an integrated irrigation system. The final object of the invention is to produce an environmentally non-polluting growing device.

Other objects and advantages of the present invention will become apparent from the following descriptions, taken in connection with the accompanying drawings, wherein, by way of illustration and example, an embodiment of the present invention is disclosed.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
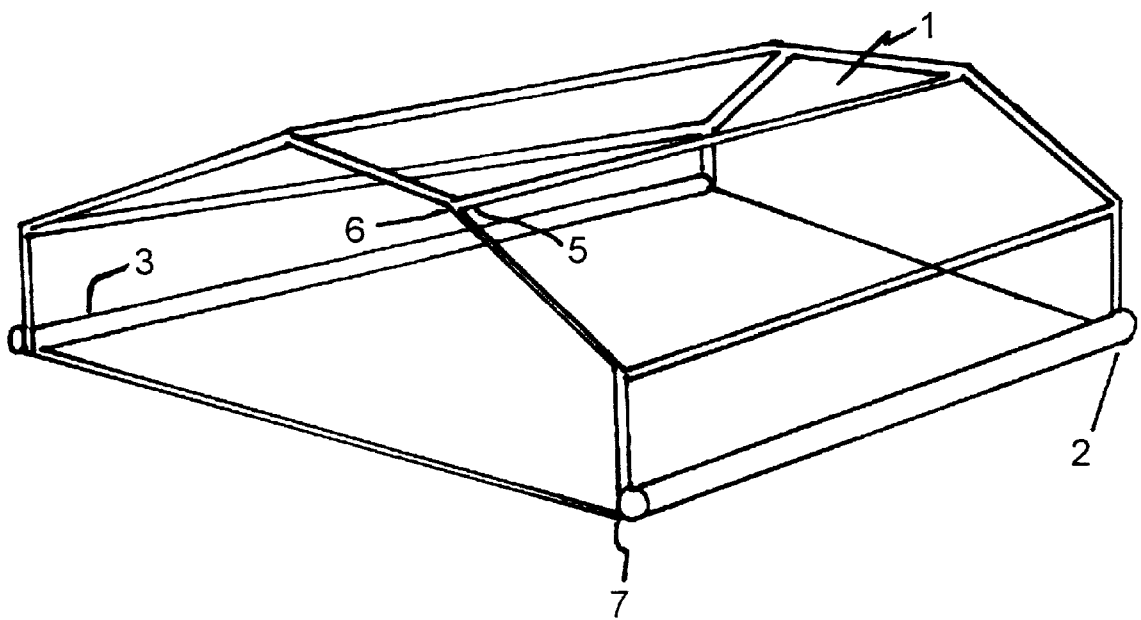
FIG. 1 is a perspective view of a growing bed.

FIG. 1 is a perspective view and general arrangement drawing of the plant growing bed. The width is 4', the height is 4' high, and the length is 4' to 10' long. It is built of schedule 40 PVC pipe, fastened with 90°–45° Ls (FIG. 1, item 6), and single 90° Ts (FIG. 1, item 5). The purpose of the growing bed is to provide a simple to assemble, lightweight, plant growing appliance with a novel light-transforming membrane for vegetable starting beds and for tomatoes and strawberries, which can be easily managed by the average homeowner. The frame will have a luminescent coating as a safety feature so that it will be visible at night to prevent collisions and accidents (e.g. tripping and falling). The membrane contains a photo-transforming additive that enhances photosynthesis by increasing conversion of the UV light spectrum. The luminescent additive may be included in the membrane, as well as in the frame, which will provide a still higher illumination level at nighttime.

Figure 2:
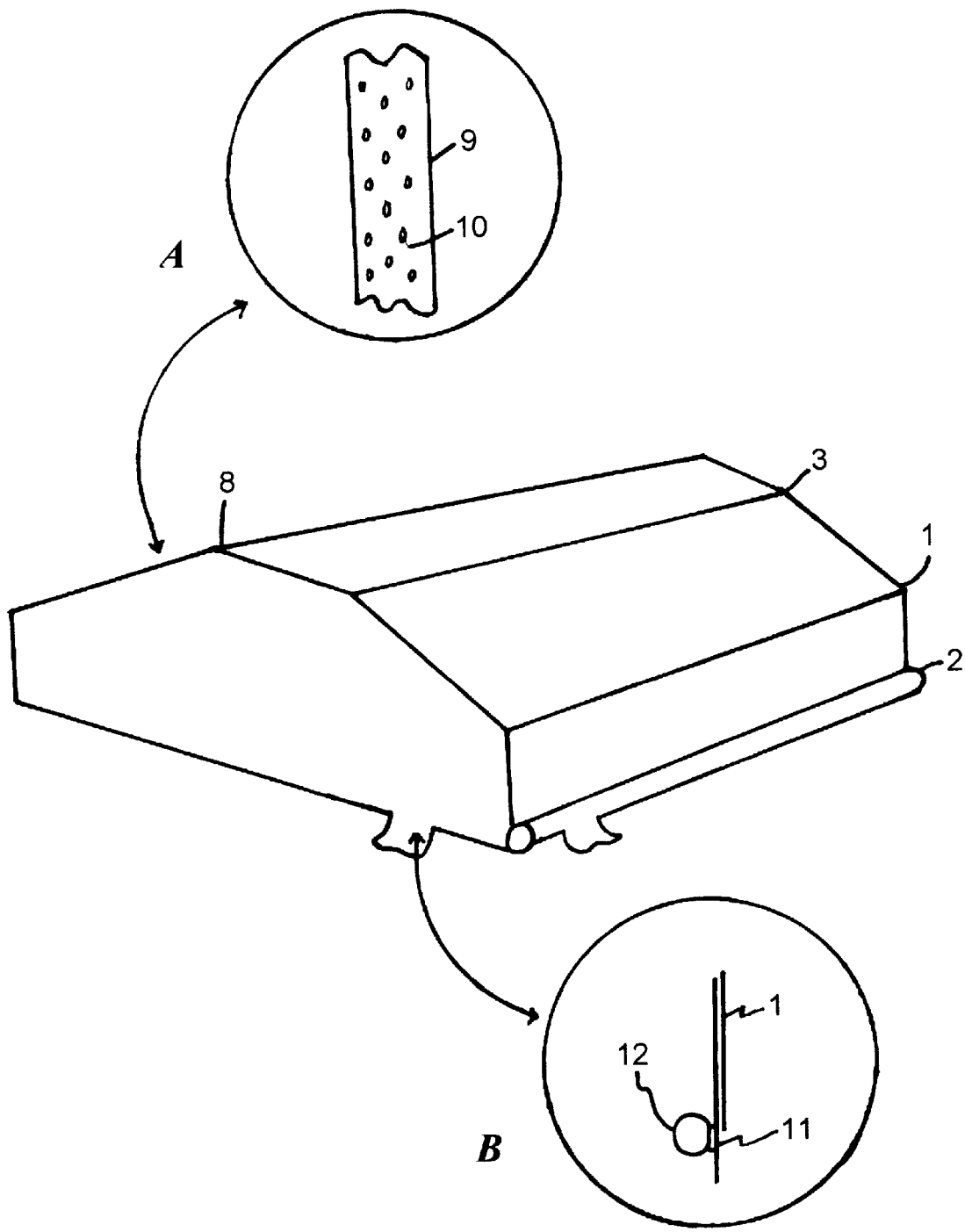
FIG. 2 is a perspective view of a membrane fitted on growing bed with detail A-cross section of membrane and detail B-velcro fastener of the membrane to the frame.

FIG. 2 is a perspective view of a fitted membrane which is made of 6–10 mil polyethylene plastic joined by heat-laminated seams over the previously mentioned frame, anchored by two (2) water-filled bladders, each having a filling and sealing fixture. One such bladder is permanently affixed to the frame as a hinge and the other bladder may be fastened to the frame at will for the purpose of locking it in place. FIG. 2A shows an inset which is a cross-section of the membrane with 20 $\mu$m particles of photo-transforming additive dispersed in it. The particle size of the additive can vary from 50 A to 50 $\mu$m range and the partial size distribution of the photo-transforming additive can be wide or narrow. FIG. 2B, item 11, shows the Velcro fastener and FIG. 2B, item 12, shows the lateral base stabilizer, the purpose of which is to show the anchoring and fastening system for the fitted membrane.

Figure 3:
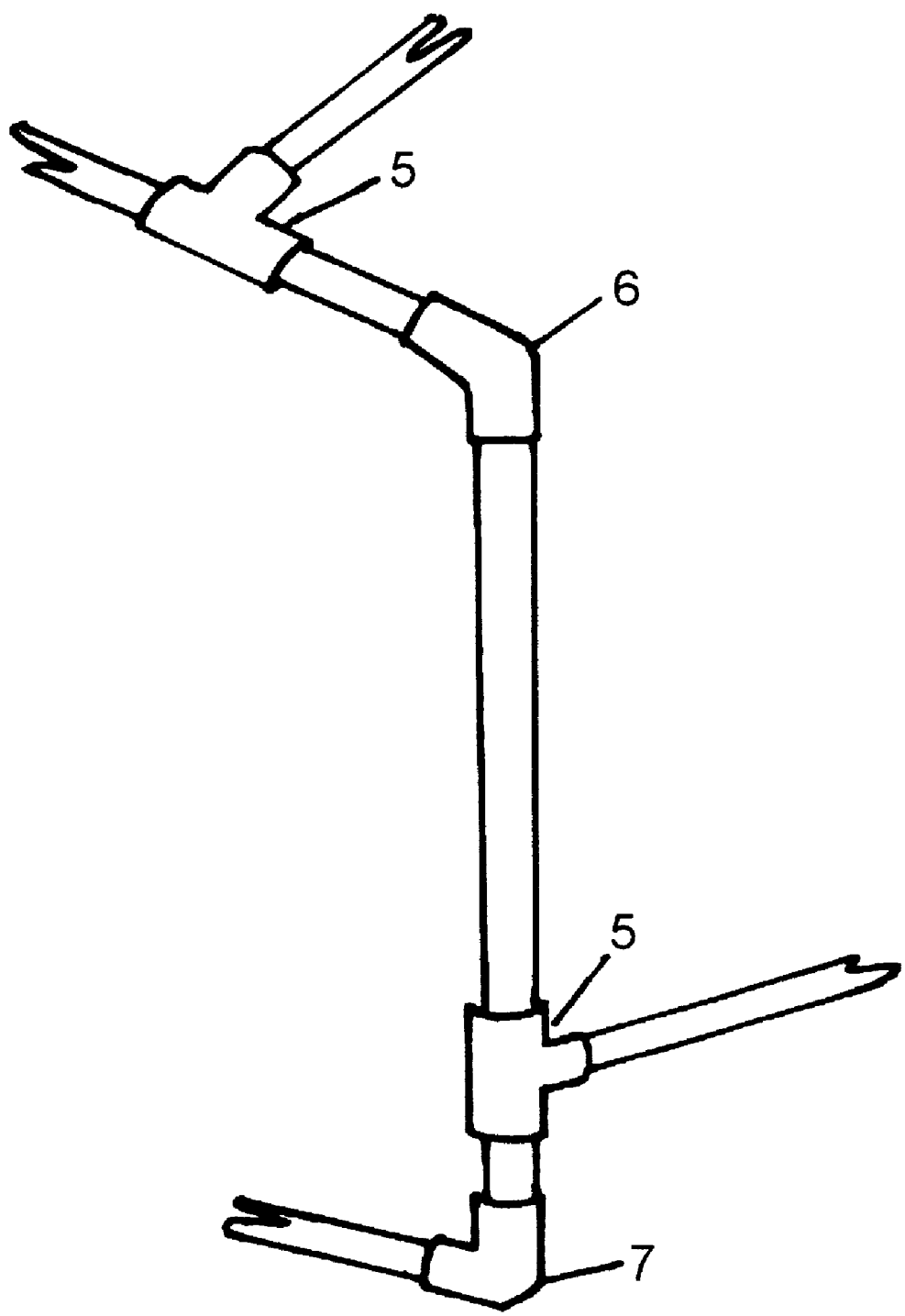
FIG. 3 is a perspective magnified view and details of frame and frame connectors.

FIG. 3 is a perspective magnified view of frame details. FIG. 3, item 5, shows the single 90° T, supporting the upper lateral frame support. FIG. 3, item 6, shows a 45° L as part of the end frame structure. FIG. 3, item 5, again shows a single 90° T, supporting a lower lateral frame support. FIG. 3, item 7, shows the 90° L for the lower side frame corner.

Figure 4:
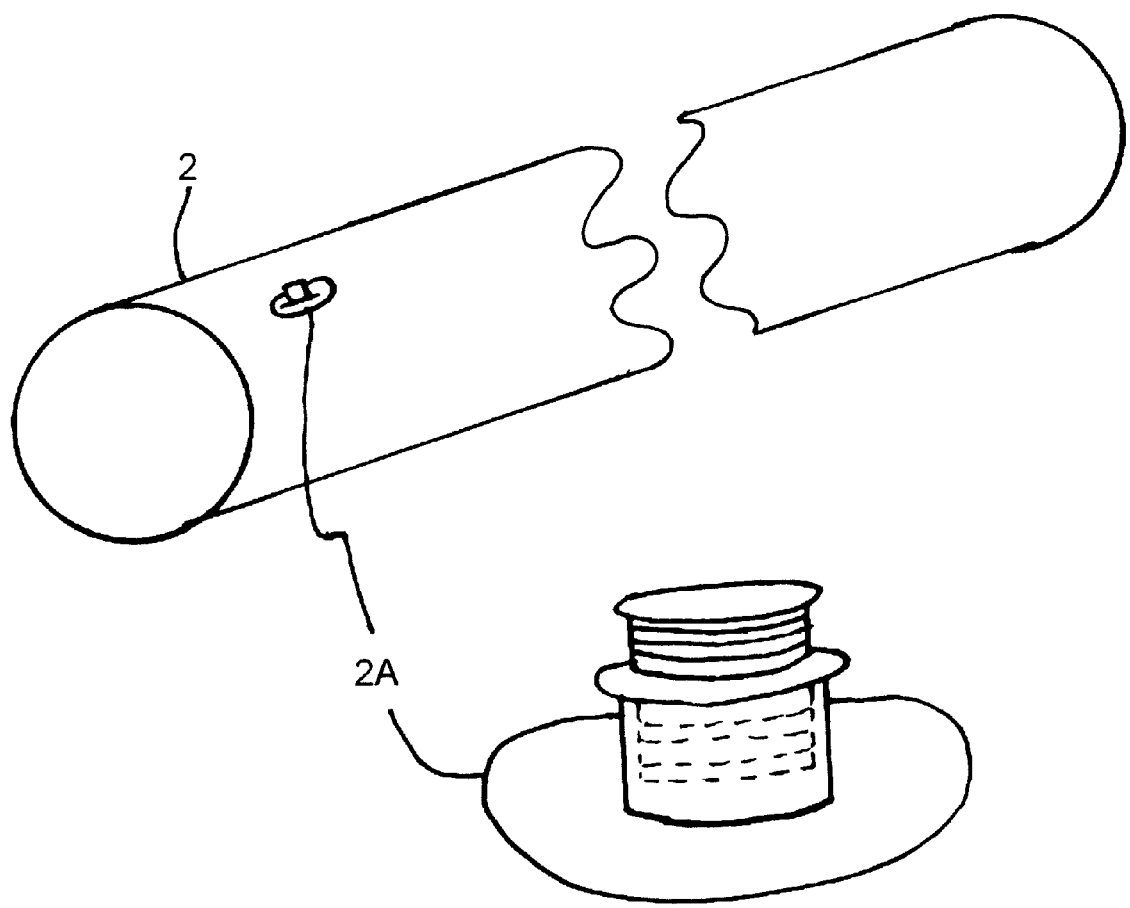
FIG. 4 is a perspective view of a water ballast and fill fixture.

FIG. 4 is a perspective view of a water ballast and fill fixture. FIG. 4, item 2, shows the water ballast locking bag and FIG. 4, item 13, shows the water ballast bag threaded plug which fits into the water ballast bag threaded filling fixture.

Figure 5:
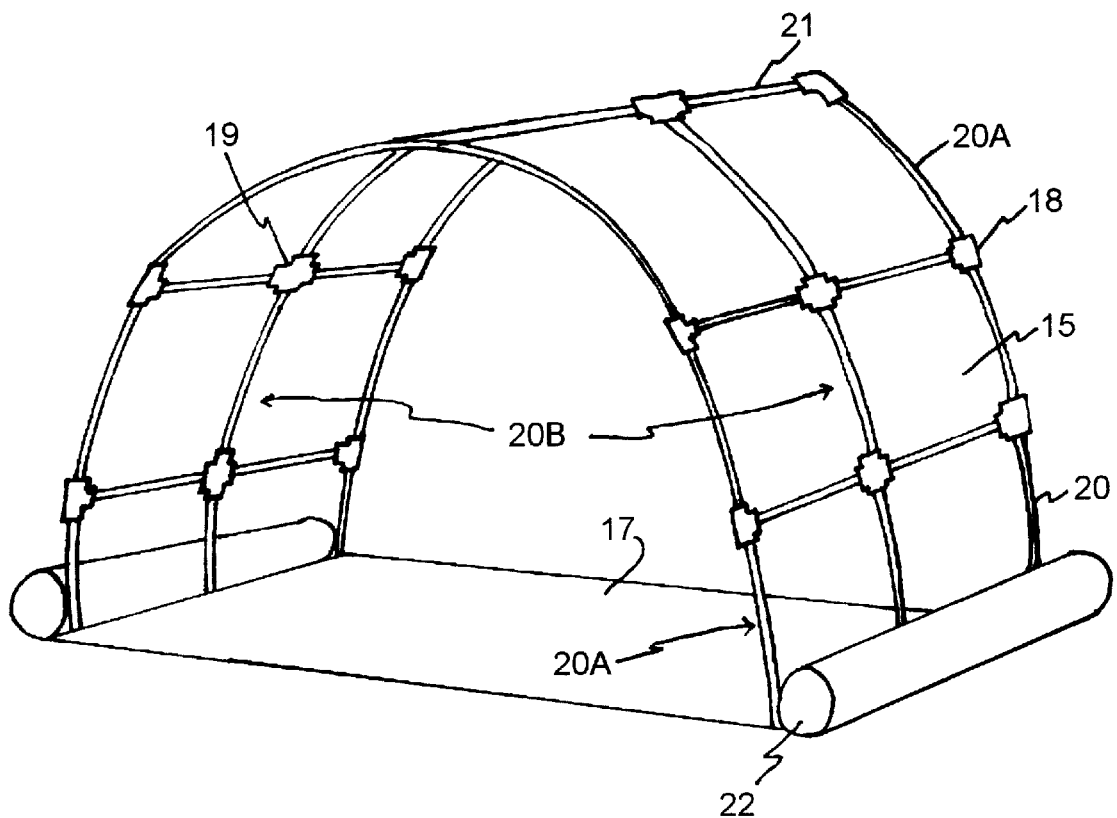
FIG. 5 is a perspective view of the plant growing device.

FIG. 5 is a perspective view of five foot plant growing device. The width is 8', the height is 7'6" high, and the length is 5' to 10' long. It is built of plasic, resin pipe, fastened with single and double 90° cross-Ts (FIG. 5, items 18 and 19). The purpose of the plant growing device is to provide a simple to assemble, lightweight, plant growing device with a novel light-transforming membrane for vegetables, tomatoes, and strawberries, which can be easily managed by the average homeowner. The frame will have a luminescent coating as a safety feature so that it will be visible at night to prevent collisions and accidents (e.g. tripping and falling). The membrane contains a phototransforming additive that enhances photosynthesis by increasing conversion of the UV light spectrum. The luminescent additive may be included in the membrane, as well as the frame, which will provide a still higher illumination level at nighttime. FIG. 5, item 15, shows the membrane shell made with 6 mil light transforming sheeting. FIG. 5, item 16, shows the membrane end with the wind valves, the purpose of which is to relieve pressure under severe weather conditions, as well as to enclose the structure. FIG. 5, item 17, shows stablizer straps to facilitate erection and maintain the appropriate arc-radius of the appliance. FIG. 5, item 20, shows the radiused ½" plastic, resin pipe, which is laterally stabilized by FIG. 5, item 21, with the 1" plastic, resin pipe. FIG. 5, item 22, shows the water bladder pocket, which is used to contain removal water bladders as anchor-weight stabilizers.

Figure 6:
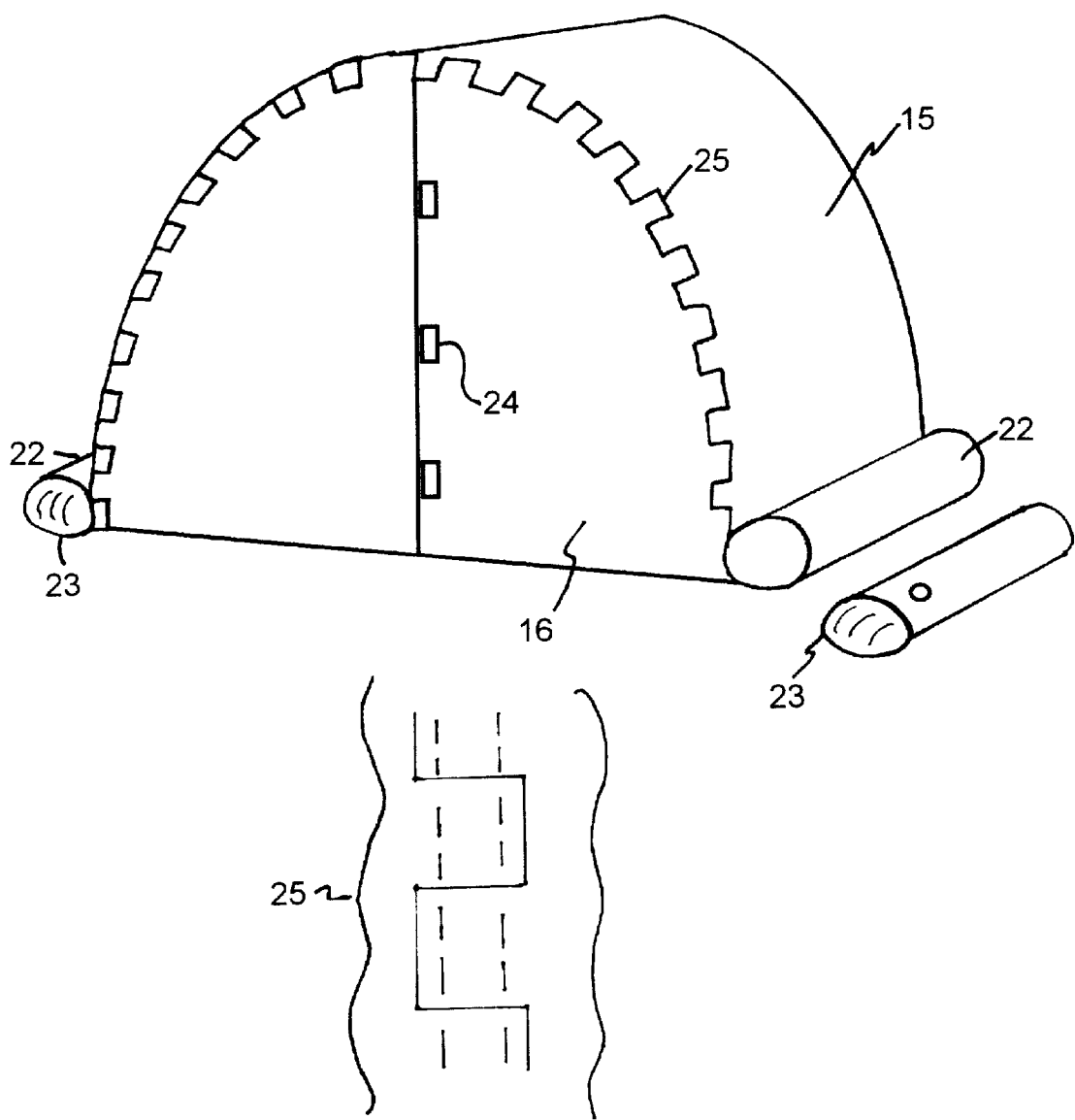
FIG. 6 is a perspective view of the membrane shell and water bladder of the plant growing device with hinge-fastening detail.

FIG. 6 is a perspective view of the membrane shell and water bladder of the 5 foot plant growing device with hinge-fastening detail. The membrane shell, item 15, is stabilized by two water bladders, item 23, that are contained in the water bladder pocket, item 22, prior to filling with water. The water bladder pocket is an integral part of the membrane shell. The membrane shell, FIG. 6, items 15 and 16, is fastened to FIG. 5, item 20A, arc support, through hinged seamed sleeve as shown in FIG. 6, detail item 25. FIG. 6, detail item 25, shows an interlocking hinged sleeve formed by thermo-lamination, resulting in a function similar to a hinge. The two parts of the membrane end with windvalve and hinged seamed sleeve, item 16, are secured by FIG. 6, item 24, velcro fasteners. FIG. 6, item 23, is a water bladder made of 6–10 mil polyethylene membrane with heat-laminated seams, containing a threaded water-filled fixture, as per FIG. 4, items 13 and 14.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A device for enhancing photo synthesis comprising, a supporting frame; and a membrane which is supported by said frame so that said membrane supported on said frame covers plants or vegetables, said membrane having photo-transforming qualities which convert UV light for plants and vegetables into growth-enhancing light that promotes photosynthesis.

2. A device as defined in claim 1, wherein said membrane is formed so that it provides at least one property selected from the group consisting of extending a growing season, accelerating a ripening period, increasing a crop yield, increasing a frost protection, increasing growing temperature, reducing crop sunburns, increasing essential vitamins in fruit and vegetables, reducing vulnerability to ultraviolet radiation and therefore a resulting degradation.

3. A device as defined in claim 2, wherein said membrane includes a photo-transforming additive that enhances photosynthesis by increasing conversion of a UV light spectrum.

4. A device as defined in claim 1, wherein said membrane has a luminescent additive providing its illumination at nighttime.

5. A device as defined in claim 1, wherein said frame has a luminescent additive providing its illumination at nighttime.

6. A device as defined in claim 1, wherein said membrane has a photo-transforming additive with a particle range from 50 A to 50 µm.

7. A device as defined in claim 1, wherein said frame has transverse lateral stabilizers composed of a plastic pipe and inserted into 90° T-shaped elements, and two substantially trapezoidal end sections composed of a plastic pipe and connected with angle elbows.

8. A device as defined in claim 7, wherein said frame is formed as a one-piece molded frame.

9. A device as defined in claim 1, wherein said frame is convertable from an operatable condition in which it can stand on a ground and an inoperative position in which it forms a compact package.

10. A device as defined in claim 1, wherein said frame is formed so that it is rapidly assembled with the use of tools.

11. A device as defined in claim 1, wherein said frame together with said membrane has an air foil design with valved panels having reduced wind resistance.

12. A device as defined in claim 1; and further comprising a ballasted, tension load which provides a stabilization for the device.

13. A device as defined in claim 1, wherein said frame is provided with an integrated water-distribution irrigation system.

* * * * *